United States Patent
Haruguchi et al.

(10) Patent No.: US 7,355,954 B2
(45) Date of Patent: Apr. 8, 2008

(54) LASER MODULE, OPTICAL PICKUP DEVICE, OPTICAL DISK DEVICE, FOCUS ERROR DETECTION METHOD AND TRACKING ERROR DETECTION METHOD

(75) Inventors: Takashi Haruguchi, Fukuoka (JP); Junichi Mutoh, Munakata (JP); Susumu Uragami, Kumamoto (JP); Masaharu Fukakusa, Kobayashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 556 days.

(21) Appl. No.: 10/913,530

(22) Filed: Aug. 9, 2004

(65) Prior Publication Data

US 2005/0036435 A1    Feb. 17, 2005

(30) Foreign Application Priority Data

Aug. 7, 2003  (JP) ............................. 2003-288775
Aug. 20, 2003 (JP) ............................. 2003-296059
Jul. 28, 2004 (JP) ............................. 2004-219755

(51) Int. Cl.
   *G11B 7/00*    (2006.01)
(52) U.S. Cl. .................. 369/112.1; 369/103; 369/44.41
(58) Field of Classification Search ........... 369/112.01, 369/112.02, 112.06, 44.11, 44.12, 103, 44.23, 369/44.24, 44.41, 112.1, 112.15
   See application file for complete search history.

(56) References Cited

U.S. PATENT DOCUMENTS

| 5,859,819 | A | 1/1999 | Miyabe |
| 5,923,636 | A | 7/1999 | Haruguchi et al. |
| 6,757,224 | B2 * | 6/2004 | Fukakusa et al. ........ 369/44.12 |
| 2002/0024916 | A1 | 7/2001 | Ueyama |
| 2002/0039330 | A1 | 9/2001 | Fukakusa |

FOREIGN PATENT DOCUMENTS

| JP | 9-35284 | 2/1997 |
| JP | 1 0154344 | 6/1998 |
| JP | 2001-155372 | 6/2001 |
| JP | 2002-92933 | 3/2002 |
| JP | 2002 175634 | 6/2002 |
| JP | 2002-175634 | 6/2002 |

OTHER PUBLICATIONS

Japanese Office Action dated Oct. 19, 2007 with English Translation thereof.

* cited by examiner

*Primary Examiner*—Nabil Hindi
(74) *Attorney, Agent, or Firm*—Stevens, Davis, Miller, & Mosher, LLP.

(57) ABSTRACT

It is an object to provide a laser module in which the position and the posture of a laser beam source can be adjusted even in a small space so that an optical intensity necessary for recording and reproducing information can be ensured and the laser module is seldom affected by an ambient temperature. It is another object of the present invention to provide an optical pickup device, an optical disk device, a focus error detection method and a tracking error detection method. The laser beam source adjustment member 55 and the laser beam source shift member 56 are attached to the laser beam source 52 so that the lead 51 can penetrate them. Further, FPC 57 is fixed to the lead 51 being soldered. The laser beam source 52 and the laser beam source adjustment member 55 are fixed between the holding plate 54 and the laser beam source shift member 56 being pushed by the pushing spring 53. The laser beam source adjustment member 55 has a spherical face formed round a light emitting point of the laser beam source 52 and is rotated round the light emitting point of the laser beam source 52 so that an inclination of the laser beam source 52 with respect to the axial direction can be adjusted.

28 Claims, 13 Drawing Sheets

RANGE TAKEN IN BY COLLIMATE LENS

LASER MODULE, OPTICAL PICKUP DEVICE, OPTICAL DISK DEVICE, FOCUS ERROR DETECTION METHOD AND TRACKING ERROR DETECTION METHOD

BACKGROUND OF THE INVENTION

1. Field of the Invention

The present invention is related to a laser module having a light source adjustment mechanism used for recording and reproducing conducted on an optical disk, an optical pickup device in which this laser module is used, an optical disk device in which this optical pickup device is used, a focus error detection method of the optical pickup device, and a tracking error detection method of the optical pickup device.

2. Description of the Related Art

In the conventional optical pickup, several types of beam splitters are used so as to separate the light source for emitting light and the optical system for detection from each other. However, there is a strong demand for downsizing the optical pickup in the market. In order meet the demand, a new attempt has been made for providing an optical unit in which the light source and the detection optical system are accommodated in the same package.

In order to realize this optical unit, an optical member, in which the diffraction grating is formed, is used. A specific embodiment of this optical member is disclosed in detail in Patent Document 1 (JP-A-10-154344). Since this optical member has been realized, the optical pickup can be greatly downsized, and a small optical disk device on which the small optical pickup is mounted has been widely spread in the market.

Recently, the optical disk device has been greatly diversified. Therefore, it has become possible to conduct recording and reproducing on both CD (Compact Disk) and DVD (Digital Versatile Disk) with one set of recording and reproducing device. The wave-length of a laser beam used for recording and reproducing CD is different from the wave-length of a laser beam used for recording and reproducing DVD. In order to conduct recording and reproducing on both CD and DVD, it is necessary to use two types of laser beams, the wave-lengths of which are different from each other.

When the downsized optical disk device has been widely spread, the following new problems are caused. For example, since the optical disk device has been downsized, the detection element and the optical member are naturally arranged close to the light source of emitting light. When the optical disk device is used over a long period of time and the use for recording is expanded, an optical output of the light source of emitting light is increased, and the temperature is raised at the same time. Further, as can be seen in the diffusion of the notebook type PC, the optical disk device is accommodated in a small housing, and the ambient temperature of the optical disk device is further raised.

When the ambient temperature range is expanded as described above, an influence is given by the coefficient of thermal expansion to the components composing the optical unit. For example, when the size and position of the optical member composing the diffraction grating are affected by heat, an error or offset is caused in the servo control.

Patent Document 2 (JP-A-2002-175634) discloses an integrated optical member capable of realizing a detecting motion of detecting a signal without affecting the detection optical system by a change in the ambient temperature. Further, Patent Document 2 discloses an optical pickup device in which this integrated optical member is used.

Furthermore, Patent Document 2 discloses an optical disk device in which this optical pickup device is used.

In this device, the following problems may be encountered. Unless a laser beam emergent from the laser beam source is emitted in an appropriate direction, an intensity of the laser beam irradiated on to the optical disk is reduced. Therefore, information can not be accurately recorded and reproduced. In order to solve the above problems, it is necessary to adjust a position of the laser beam source. Further, it is also necessary to adjust a posture of laser beam source. However, when the size of the device is reduced, mechanisms to adjust the position and the posture of the laser beam source are restricted. Therefore, it is required that the position and the posture of the laser beam source can be sufficiently adjusted in a small space.

In this device, it is necessary to accurately conduct a signal detecting action to conduct recording and reproducing on CD, and it is also necessary to accurately conduct a signal detecting action to conduct recording and reproducing on DVD. It is necessary that these signal detecting actions are conducted without being affected by a change in the ambient temperature.

SUMMARY OF THE INVENTION

The present invention has been accomplished to solve the above problems. It is an object of the present invention to provide a laser module in which the position and the posture of the laser beam source can be adjusted even in a small space so that an optical intensity necessary for recording and reproducing information can be ensured. It is another object of the present invention to provide an optical pickup device in which this laser module is used. It is still another object of the present invention to provide an optical disk device in which this optical pickup device is used.

It is still another object of the present invention to provide an optical pickup device, the detection optical system of which is not affected by a change in the ambient temperature, so that a signal detecting action, which is difficult to be affected by cross talk, can be realized in the recording and reproducing device of CD and DVD. It is still another object of the present invention to provide an optical disk device in which this optical pickup device is used. It is still another object of the present invention to provide a focus error detection method and a tracking error detection method in which this optical pickup device is used.

The present invention has been accomplished to solve the above problems. A laser module for conducting at least one of the recording and reproducing of information on an optical disk, comprises: a laser beam source having a laser element emitting a laser beam; and a laser beam source adjustment member for adjusting a direction of the laser beam source, the laser beam source adjustment member being arranged on the opposite side to an output section from which a laser beam is emitted in the laser beam source.

According to the present invention, an optical intensity of the laser beam irradiated on an optical disk can be maximized by adjusting an optical axis of the laser beam emergent from the laser beam source. Therefore, the optical intensity necessary for recording and reproducing information can be ensured, and the reliability of recording and reproducing information can be enhanced.

The present invention provides an optical pickup device comprising: a hologram for CD having a region for separating a luminous flux, which is used at least for tracking control, from a beam of reflected light which is emitted from a light source for CD and reflected on CD and which conducts at least one of the recording and reproducing of information by irradiating a laser beam on CD; and a hologram for DVD having a region for separating a luminous flux, which is used at least for tracking control, from a beam of reflected light which is emitted from a light source for DVD and reflected on DVD and which conducts at least one of the recording and reproducing of information by irradiating a laser beam on DVD, the hologram for DVD also having a region for separating a luminous flux which is used for correcting the tracking control.

According to the present invention, the detection optical system is not affected by a fluctuation of the ambient temperature. Further, it is possible to realize a signal detecting action which is not liable to be affected by cross talk. Even if deviation is caused on the emergent pattern of the laser beam which is emergent from the laser beam source, the signal detection can be accurately conducted.

According to the laser module of the present invention, even in an occupied space which is smaller than a space in which a spherical face formed round the light emitting point is provided on the objective lens side with respect to the light emitting point, the laser beam source can be adjusted. When this laser module is provided, while an optical intensity necessary for recording and reproducing information is being ensured, a highly reliable optical pickup device and optical disk device can be realized.

According to the optical pickup device of the present invention, the detection optical system is not affected by a fluctuation of the ambient temperature. Therefore, it is possible to realize a signal detecting action which is not liable to be affected by cross talk. Even if deviation is caused on the emergent pattern of the laser beam which is emergent from the laser beam source, the signal detection can be accurately conducted.

According to the optical disk device the present invention, the detection optical system is not affected by a fluctuation of the ambient temperature. Further, it is possible to realize a signal detecting action which is not liable to be affected by cross talk. Even if deviation is caused on the emergent pattern of the laser beam which is emergent from the laser beam source, the signal detection can be accurately conducted, and information can be recorded on and reproduced from an optical disk.

According to the focus error detection method of the optical pickup device of the present invention, a drift and offset of the detection signal caused by a fluctuation of the ambient temperature can be canceled. Therefore, it is possible to realize a focus error detection method of the optical pickup device in which the detection optical system is not affected by a fluctuation of the ambient temperature.

According to the tracking error detection method of the optical pickup device of the present invention, a drift and offset of the detection signal caused by a fluctuation of the ambient temperature can be canceled. Therefore, it is possible to provide a tracking error detection method of the optical pickup device, the detection optical system of which is not affected by a fluctuation of the ambient temperature. Further, it is possible to realize a tracking error detection method of the optical pickup device which is not affected by a deviation of the emergent pattern of the laser beam emergent from the laser beam source.

DESCRIPTION OF THE PREFERRED EMBODIMENTS

Figure 1:
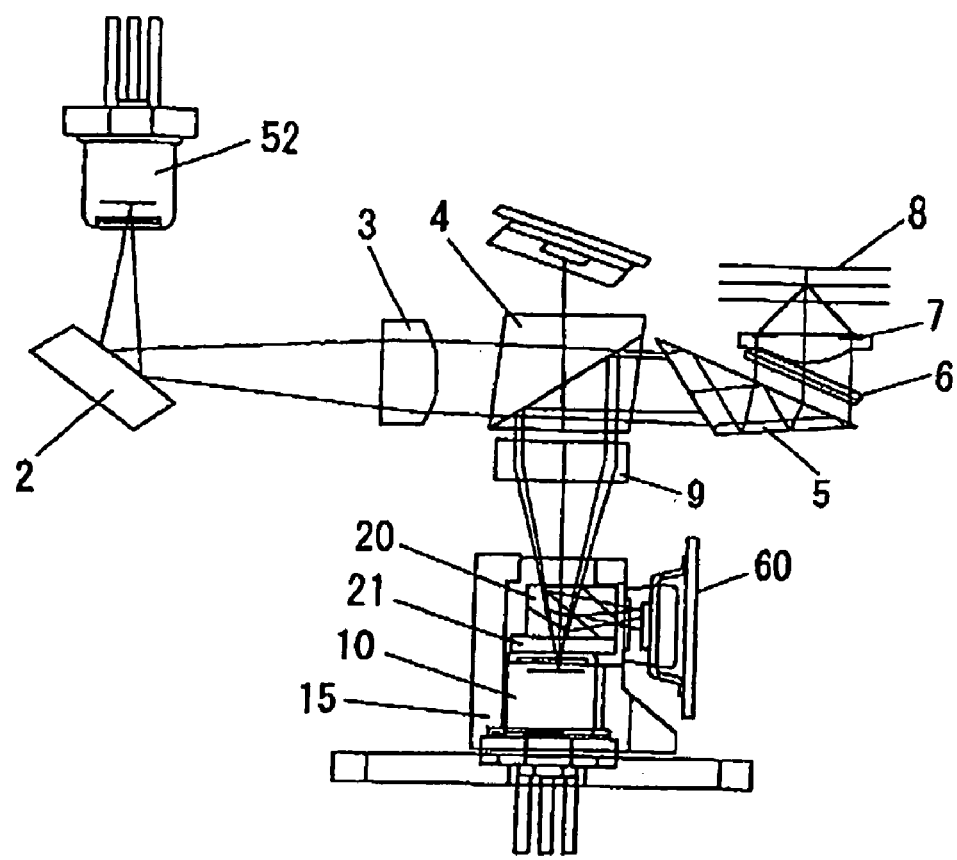
FIG. 1 is an arrangement view showing an optical pickup device of an embodiment of the present invention.

Referring to the drawings, an embodiment of the present invention will be explained below.

FIG. 1 is an arrangement view of the optical pickup device of the embodiment of the present invention.

The optical pickup device of the present embodiment is composed on the assumption that the optical pickup device can be used for both CD and DVD. In the optical pickup device used for CD, a laser beam, the wave-length of which is 780 nm (referred to as the second wave-length) is used. In the optical pickup device for DVD, a laser beam, the wave-length of which is 660 nm (referred to as the first wave-length) is used.

A laser beam of the first wave-length emergent from the laser beam source 52 used for DVD, which is the first laser beam source, is reflected on the reflection mirror 2, so that the proceeding direction of the laser beam can be changed. Then, the laser beam is changed from a divergent beam to a parallel beam by the collimate lens 3. The thus obtained parallel beam is transmitted through the beam splitter 4 and the proceeding direction of the beam is changed by the rising prism 5. On the beam splitter 4, a multilayer film is formed which transmits a laser beam used for DVD and reflects a laser beam used for CD. On the rising prism 5, a multilayer film is formed which reflects both the laser beam used for DVD and the laser beam used for CD at a high reflectivity. The laser beam reflected on the rising prism 5 is transmitted through the hologram 6 for DVD and then condensed by the objective lens 7 and irradiated onto the optical disk 8.

The laser beam reflected on the optical disk 8 is transmitted through the objective lens 7, the hologram 6 for DVD and the rising prism 5 and then reflected on the beam splitter 4. Then, the laser beam is condensed by the collimate lens 9 and incident on the integrated optical member 20. After that, the laser beam is incident from the integrated optical member 20 onto the light receiving device 60. The detail of the integrated optical member 20 will be described later.

On the other hand, a laser beam of the second wave-length emergent from the laser beam source 10 used for CD, which is the second laser beam source, is transmitted through the integrated optical member 20 and then converted into a parallel beam by the collimate lens 9 and reflected by the beam splitter 4. After that, the laser beam is reflected by the rising prism 5, and the proceeding direction is changed. Then, the laser beam is transmitted through the hologram 6 for DVD and condensed by the objective lens 7 and irradiated onto the optical disk 8.

The laser beam reflected on the optical disk 8 is transmitted through the objective lens 7, the hologram 6 for DVD and the rising prism 5 and then reflected on the beam splitter 4. Then, the laser beam is condensed by the collimate lens 9 and incident on the integrated optical member 20. After that, the laser beam is incident from the integrated optical member 20 onto the light receiving device 60.

The laser beam source 10 for CD which is the second laser beam source, the integrated optical member 20, the light receiving device 60 which receives a laser beam of 660 nm for DVD which is a laser beam of the first wave-length and also receives a laser beam of 780 nm for CD which is a laser beam of the second wave-length, and the first light guide member 21 described later are incorporated into or attached to the joining member 15 and formed into a unit. This unit is referred to as a laser unit.

Figure 2:
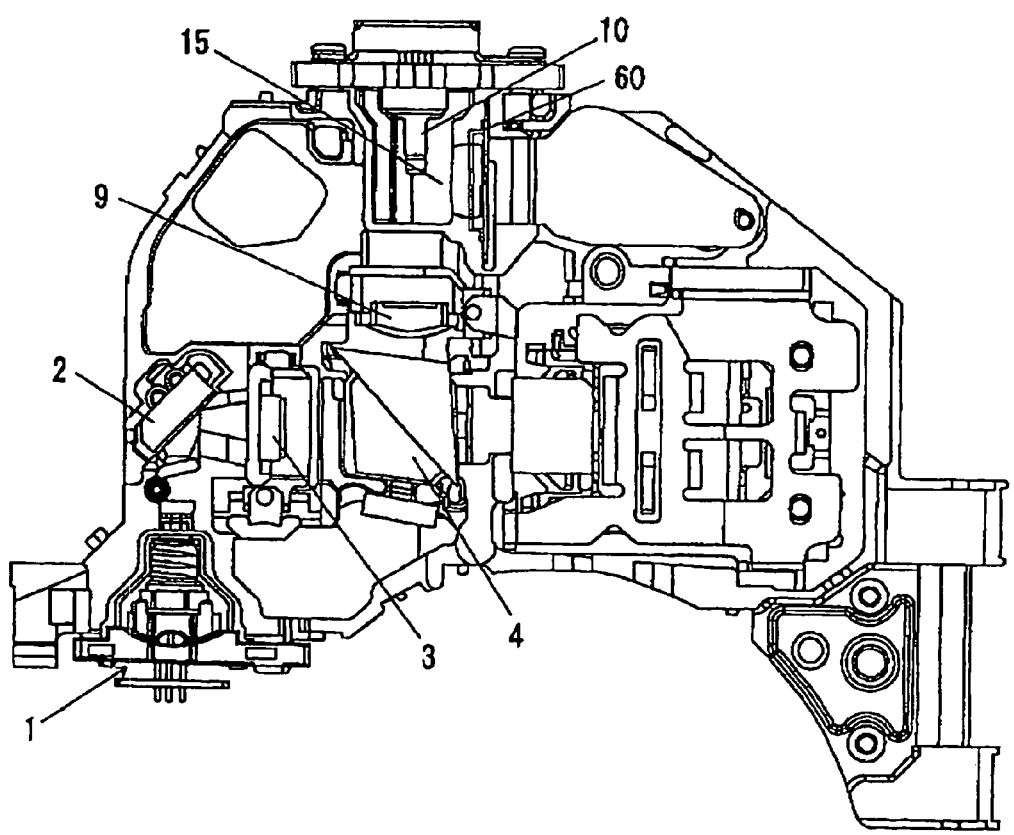
FIG. 2 is a view showing an example in which components of the optical pickup device are mounted.

FIG. 2 is a view showing another embodiment in which components of the optical pickup device shown in FIG. 1 are mounted.

Figure 3:
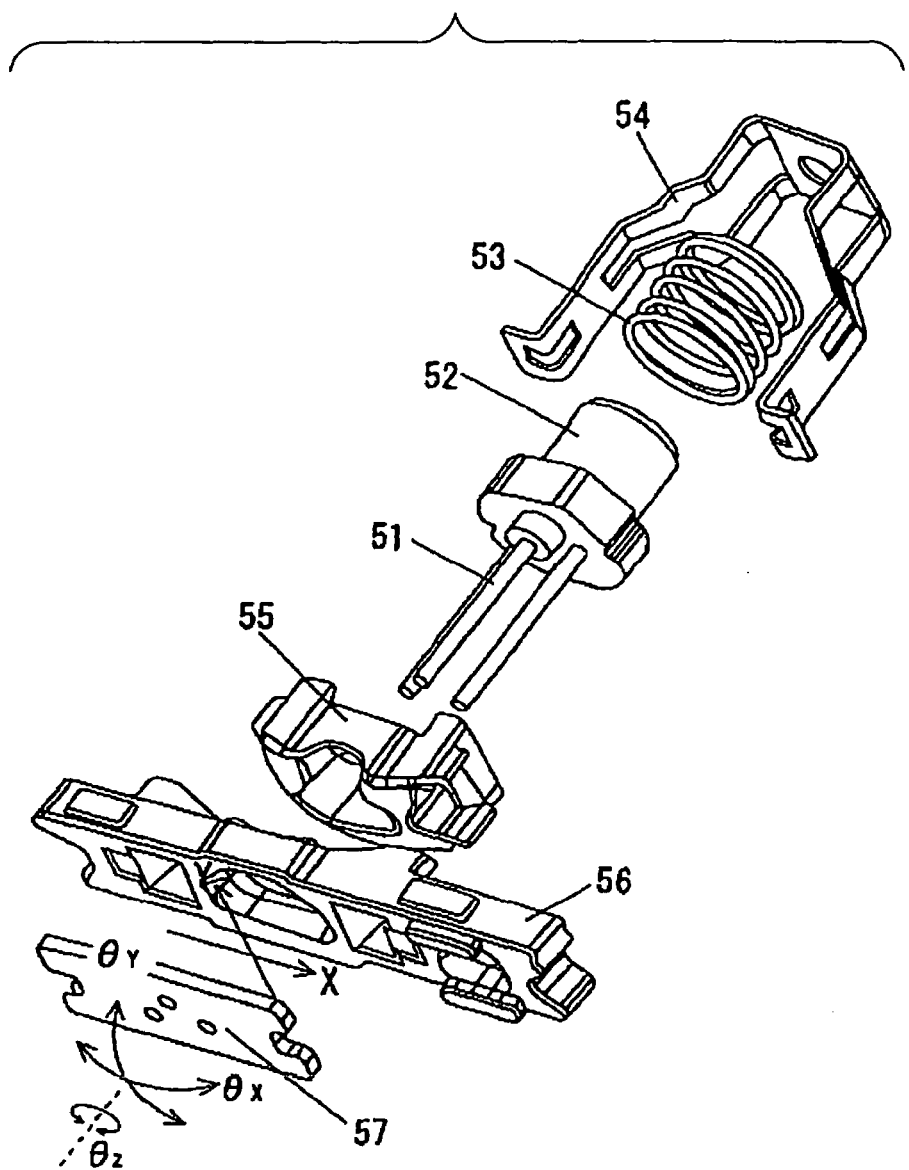
FIG. 3 is an exploded perspective view of the laser module of the embodiment of the present invention.

In FIG. 2, the laser module 1 for DVD which conducts at least one of the recording or reproducing of information on an optical disk (DVD) is arranged so that a light emitting face of the laser beam source can be opposed to the reflection mirror 2. FIG. 3 is an exploded perspective view of the laser module 1 used for DVD.

The laser beam source 52 and the laser beam source adjustment member 55, which are shown in FIG. 3, are fixed to each other by means of soldering or adhesive. Through-holes are formed in the laser beam source adjustment member 55. Into these through-holes, the leads 51 are penetrated which supply electric power to the laser beam source 52 being arranged on the opposite side to the output section of the laser beam source 52 from which a laser beam is emergent, and the laser beam source 52 and the laser beam source adjustment member 55 are fixed to each other. That is, the laser beam source adjustment member 55 is arranged on the opposite side to the output section of the laser beam source 52. It is necessary that the inner diameter of the through-hole is sufficiently large for making the lead 51 penetrate the through-hole according to the structure of penetrating the lead 51. For example, as compared with a structure in which the light emitting section of the laser beam source 52, the diameter of which is large, is penetrated, the laser beam source adjustment member 55 can be downsized. The laser beam source adjustment member 55 and the laser beam source shift member 56 respectively have a spherical face formed round the light emitting point of the laser beam source 52.

The pushing spring 53 is provided on the side of the light emitting section of the laser beam source 52 fixed to the laser beam source adjustment member 55. The holding plate 54, which is a holding member, is arranged so that it can cover the outside of the pushing member 53 from the output section side of the laser beam source 52. The holding plate 54 provided on the output section side of the laser beam source 52 has a through-hole, and a laser beam is emergent from this through-hole of the holding plate 54.

Under the condition that the spherical face of the laser beam source adjustment member 55 and the spherical face of the laser beam source shift member 56 are contacted with each other, the holding plate 54 is attached to the laser beam source shift member 56. At this time, the laser beam source 52 and the holding plate 54 are pushed to each other by the pushing spring 53.

In the laser beam source shift member 56, through-holes, through which the leads 51 of the laser beam source 52 penetrate, are formed. Each lead 51 of the laser beam source 52, which has penetrated the through-hole of the laser beam source adjustment member 55, penetrates the through-hole of the laser beam shift member 56 and soldered and fixed to FPC 57. The laser beam source 52 and the laser beam source adjustment member 55 are supported by the laser beam source shift member 56 by the holding plate 54 via the pushing spring 53.

In the laser module 1 for DVD composed as described above, the laser beam source adjustment member 55 has a spherical face formed round the light emitting point of the laser beam source 52. Therefore, the laser beam source 52 can be rotated round the light emitting point so that the direction can be changed. In this way, a tilt of the laser beam source 52 with respect to the axial direction can be adjusted. In this case, adjustments can be made in the rotating directions of $\theta_x$, $\theta_y$ and $\theta_z$ shown in the drawing. Further, adjustments can be made in the rotating directions in which these directions are combined with each other.

The laser beam shift member 56 has a spherical face formed round the light emitting point of the laser beam source 52. While the laser beam shift member 56 is supporting the spherical face of the laser beam source adjustment member 55, the laser beam shift member 56 has a function of sliding and adjusting the entire laser module 1 for DVD in the directions X and Y shown in the drawing with respect to the optical pickup device. FPC 57 supplies electric power to the laser beam source 52 so as to generate a laser beam from the laser beam source 52. Further, FPC 57 functions as a grasping member used when the laser beam source 52 and the laser beam source adjustment member 55 are rotated.

Figure 4:
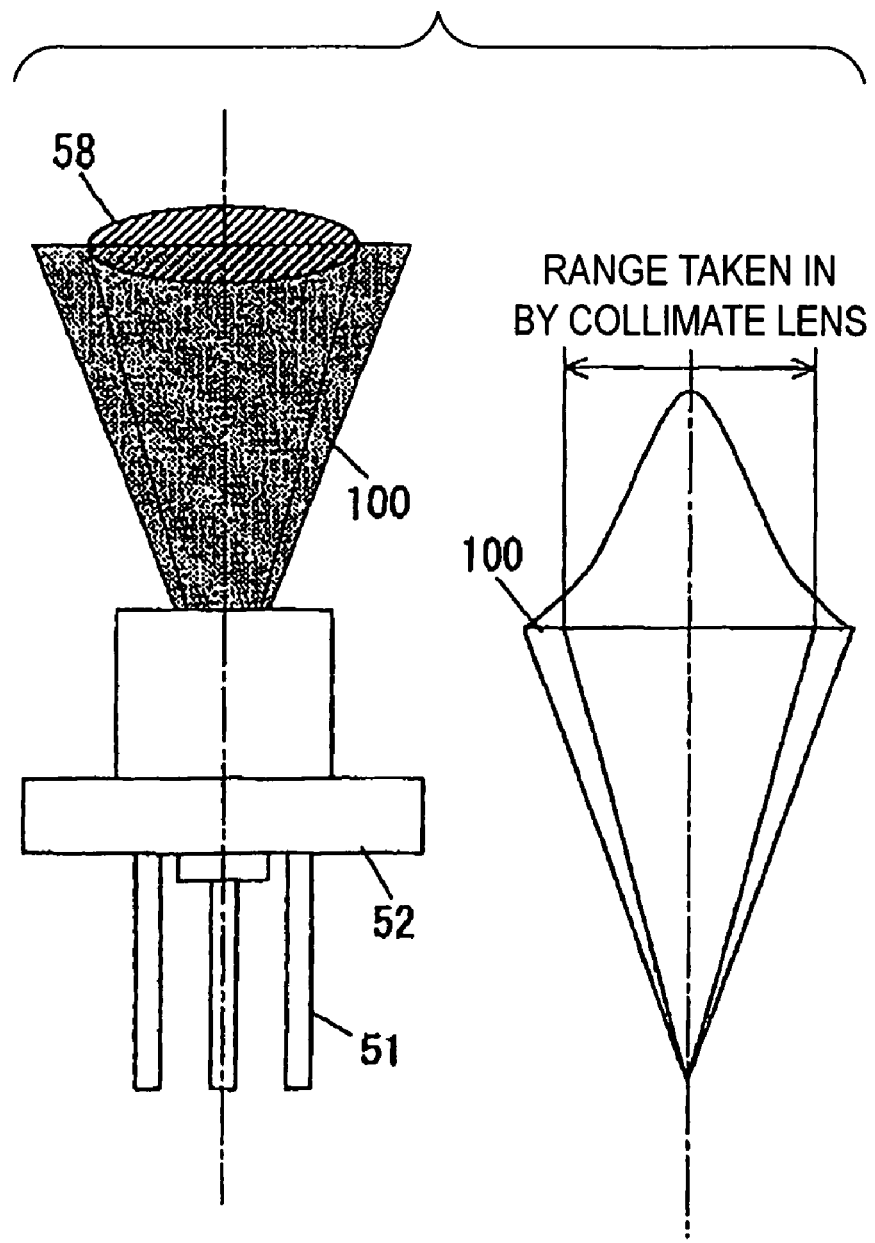
FIG. 4 is a view showing a case in which an optical axis of the laser beam emergent from the laser beam source is not tilted.
Figure 5:
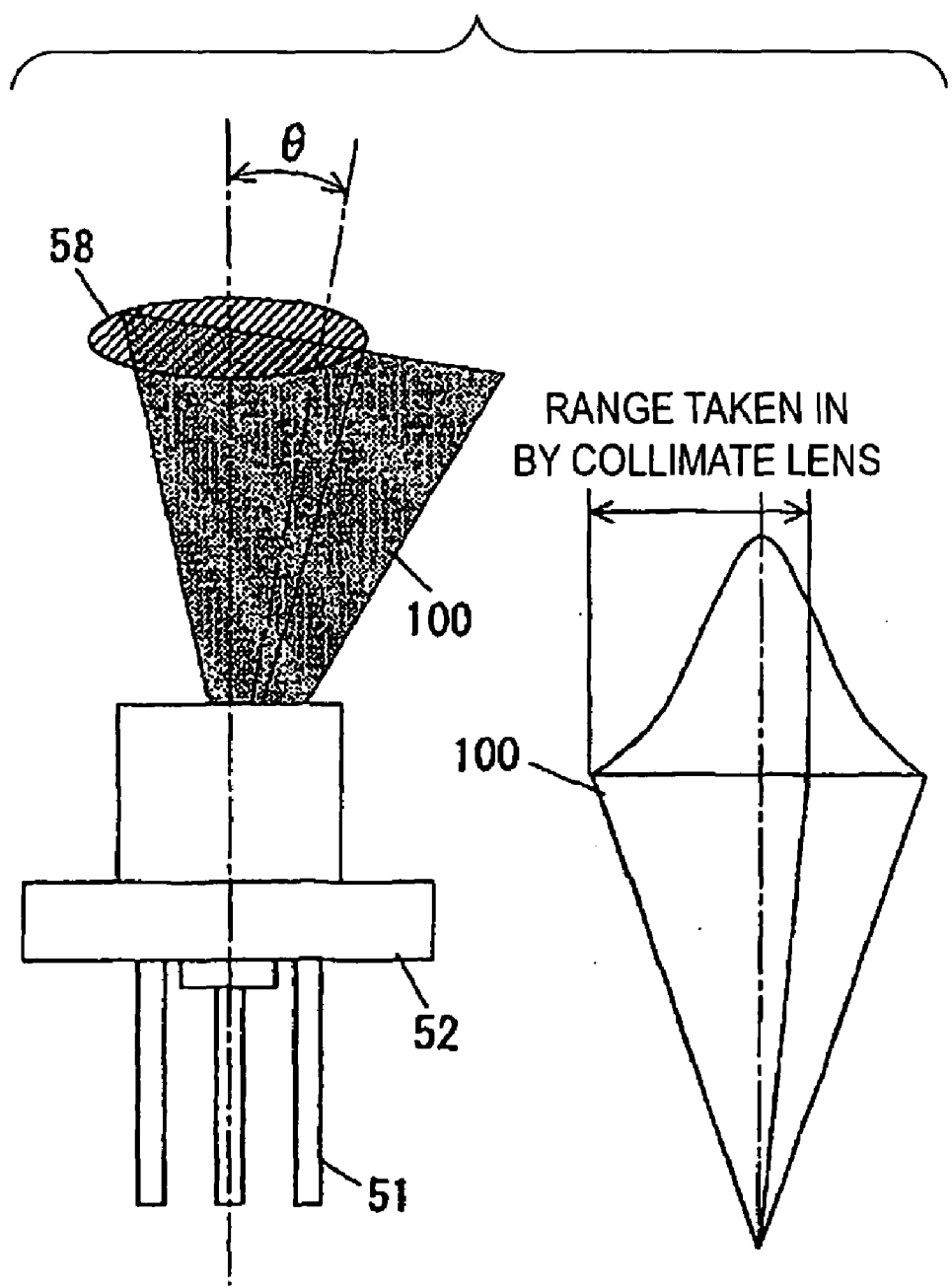
FIG. 5 is a view showing a case in which an optical axis of the laser beam emergent from the laser beam source is tilted.

FIGS. 4 and 5 are views showing circumstances in which the direction of the laser beam source 52 is adjusted by the laser beam source adjustment member 55 and the optical axis of the emergent laser beam is adjusted.

FIG. 4 is a view showing a case in which the optical axis of the laser beam emergent from the laser beam source 52 is not tilted. Since the center of the intensity of the laser beam 100 coincides with the center of the collimate lens 58, a quantity of laser beam incident on the collimate lens 58 is maximized in the laser beam 100 emergent from the laser beam source 52.

On the other hand, as shown in FIG. 5, when the optical axis of the laser beam emergent from the laser beam source 52 is tilted by the angle $\theta$, the center of the intensity of the laser beam 100 does not coincide with the center of the collimate lens 58. Therefore, a quantity of light incident on the collimate lens 58 in the laser beam 100 emergent from the laser beam source 52 is reduced smaller than the quantity of light incident on the collimate lens 58 shown in FIG. 4.

In this case, as shown in FIG. 3, when FPC 57 is used as a grasping member and FPC 57 is moved in the directions of $\theta_x$, $\theta_y$ and $\theta_z$, both the laser beam source 52 and the laser beam source adjustment member 55 are rotated round the light emitting point of the laser beam source 52, so that the state can be made into the state shown in FIG. 4. At the same time, the laser beam source 52 is moved by the laser beam source shift member 56 in the direction X or Y with respect to the optical pickup device, so that the center of the intensity of the laser beam 100 can be made to coincide with the center of the collimate lens 58.

Figure 6:
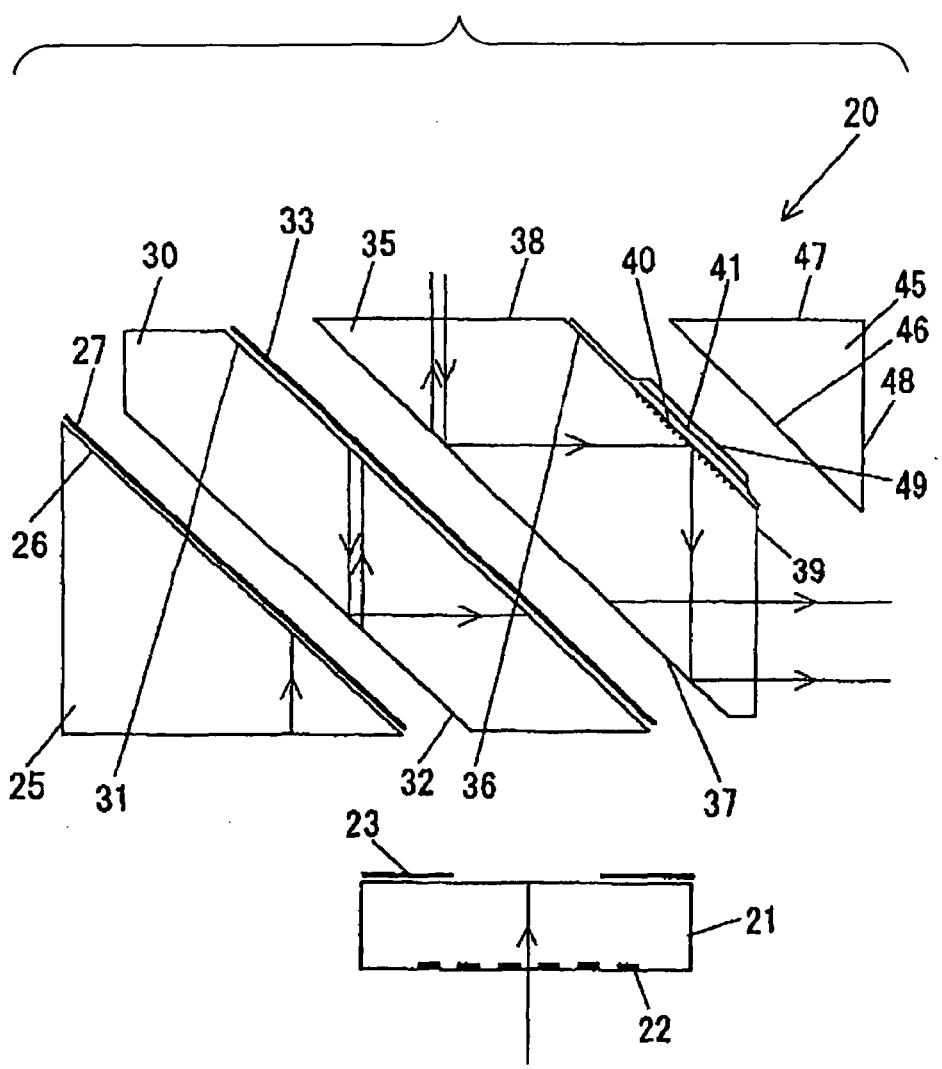
FIG. 6 is a view showing a structure of the integrated optical member.

FIG. 6 is a view showing a constitution of the integrated optical member 20.

FIG. 5 is an exploded view showing each laser beam guide member composing the integrated optical member 20. The integrated optical member 20 is comprised of the first to the fifth laser beam guide member. Each laser beam guide member is made of resin, the light transmitting property of which is high, or made of optical glass. Especially, since the refraction index of the optical glass of SFL-1.6 or BK-7 is high, the diffraction grating and the film can be designed while leaving great allowances. Further, the optical glass of SFL-1.6 or BK-7 is characterized in that the wave-length shift is seldom caused at the time of transmission. Especially, BK-7-1.5 can be easily acquired and processed. Therefore, it is preferable to use BK-7-1.5.

Next, each laser beam guide member will be explained below. The first laser beam guide member 21 is formed into a parallel plate shape. The first diffraction grating 22 is composed on a face on which the first laser beam guide member 21 is opposed to an emergent port of the laser beam source 10. That is for generating a primary and an auxiliary beam (referred to as three beams hereinafter) used for tracking control by using the diffracted zero-order laser beam and ±first-order laser beam.

On the emergent face of the first laser beam guide member 21, the light absorbing film 23 is formed on the overall face except for the region in which the laser beam is transmitted. Concerning the composition of the light absorbing film 23, for example, the light absorbing film 23 is comprised of a multilayer film made of Si, Ti and $SiO_2$. The reason why the multilayer film is used is that unnecessary beams caused by irregular reflection and stray light are prevented from getting into the integrated optical member 20 and the optical path of the laser beam.

The second laser beam guide member 25 is formed into a substantially triangle pole shape, the cross section of which is a right-angled triangle. On the inclined plane 26 of the substantially right-angled triangle, the wave-length selection film 27 is formed in a predetermined region. The wave-length selection film 27 separates the outward laser beam for CD and the inward laser beam for DVD from each other. The wave-length selection film 27 has a function of transmitting the outward laser beam for CD and reflecting the inward laser beam for DVD. The wave-length of the laser beam for CD and the wave-length of the laser beam for DVD are different from each other. Therefore, both can be separated from each other by the wave-length selection film 27.

The third laser beam guide member 30 is formed into a plate shape having parallel planes opposed to each other. The first inclination plane 31 and the second inclination plane 32 are parallel planes opposed to each other. On the first inclination plane 31, the wide band polarization separating film 33 is formed. This wide band polarization separating film 33 separates the outward laser beam for CD and the inward laser beam for CD from each other. The wide band polarization separating film 33 has a function of transmitting the outward laser beam for CD and reflecting the inward laser beam for CD. Since the polarization state of the outward laser beam for CD is different from the polarization state of the inward laser beam for CD, both can be separated from each other by the wide band polarization separating film 33.

The fourth laser beam guide member 35 is formed into a substantially trapezoidal pole shape, the cross section of which is a substantial trapezoid. This laser beam guide member 35 has a first inclination face 36, a second inclination face 37, a transmission face 38 and an emergent face 39. The first inclination face 36 and the second inclination face 37 are formed into parallel planes which are opposed to each other. The hologram 40 for CD is formed in a predetermined region on the first inclination face 36. APC reflection film 41 is provided on an upper face of the hologram 40 for CD. The function of this hologram 40 for CD will be described later.

With respect to the fourth laser beam guide member 35, the outward laser beam for CD is transmitted from the second inclination face 37 to the transmission face 38. The inward laser beam for CD is reflected on the second inclination face 37 and then transmitted through the hologram 40 for CD and reflected on APC reflection mirror 41. After the beam of light has been reflected on the second inclination face 37 again, it is emergent from the emergent face 39. In the same manner, the inward laser beam for DVD is emergent from the emergent face 39.

The fifth laser beam guide member 45 is formed into a substantially triangular pole shape, the cross section of which is a right-angled triangle. The fifth laser beam guide member 45 has an inclination face 46, a first face 47 and a second face 48. The first face 47 and the second face 48 cross each other, making a right angle and form a reference face of the integrated optical member 20. On the inclination face 46, the light absorbing film 49 is formed.

Figure 7:
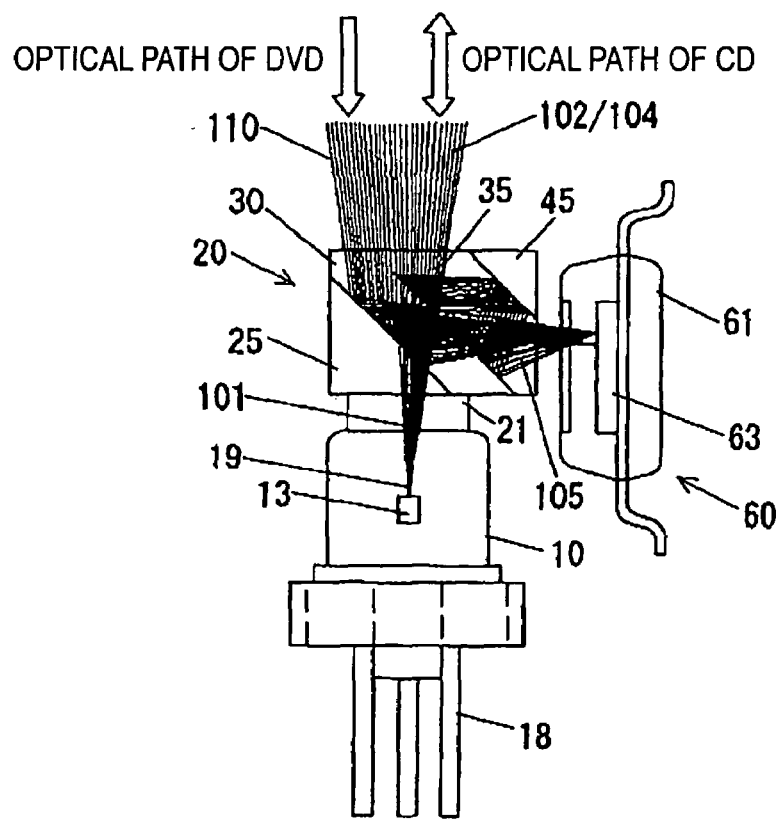
FIG. 7 is a view showing an optical path in the integrated optical member until a laser beam is incident on the light receiving device.

Referring to FIGS. 1, 6 and 7, optical paths of the laser beams for DVD and CD are shown until the laser beams reach the light receiving device 60.

A predetermined connection is made for the leads 18 of the laser beam source 10 for CD, and the laser element 13 emits a diffusion laser beam 101 for CD from the light emitting point 19. The diffusion laser beam 101 is incident on the first laser beam guide member 21. The first laser beam guide member 21 absorbs unnecessary disturbing light and spreading light, which has spread by an angle not less than a predetermined diffusion angle, by the light absorbing film 23. Further, the first laser beam guide member 21 converts the diffusion laser beam 101 into the outward laser beam 102 for CD of the three beams by the first diffraction grating 22.

The outward laser beam 102 for CD is incident from the first laser beam guide member 21 to the second laser beam guide member 25. The outward laser beam 102 for CD proceeding in the second laser beam guide member 25 arrives at the inclination face 26. Almost all quantity of laser beam in the outward laser beam 102 for CD is transmitted through the wave-length selection film 27 and incident on the third laser beam guide member 30. Further, the laser beam is transmitted through the first inclination face 31 of the third laser beam guide member 30 and further transmitted through the transmission face 38 of the fourth laser beam guide member 35. Then, the laser beam changes its proceeding direction toward the hologram 6 for DVD by the beam splitter 4 and the rising prism 5. Then, the laser beam is formed into a convergent laser beam by the action of the objective lens 7 and is incident on the optical disk 8.

The inward laser beam 104 reflected on the recording layer of the optical disk 8 is transmitted through the objective lens 7 and the rising prism 5 in the reverse order and incident on the transmission face 38 of the fourth laser beam guide member 35. The inward laser beam 104 for CD is reflected by the wide band polarization separating film 33 and proceeds to the hologram 40 for CD of the third laser beam guide member 35. In the hologram 40 for CD, the laser beam becomes the inward reflection diffraction laser beam 105 for CD, the primary component of which is + the first diffraction laser beam. The inward reflection diffraction laser beam 105 for CD is reflected again by the wide band polarization separating film 33 of the third laser beam guide member 30 and emergent from the emergent face 39 toward the light receiving device 60.

On the other hand, the inward laser beam 110 for DVD, which is emergent from the laser beam source for DVD and reflected on the optical disk 6, is reflected on the wavelength selection film 27 formed on the inclination face 26 of the second laser beam guide member 25. Then, the laser beam is transmitted through the third laser beam guide member 30 and the fourth laser beam guide member 35 and emergent from the emergent face 39 toward the light receiving device 60.

Figure 8:
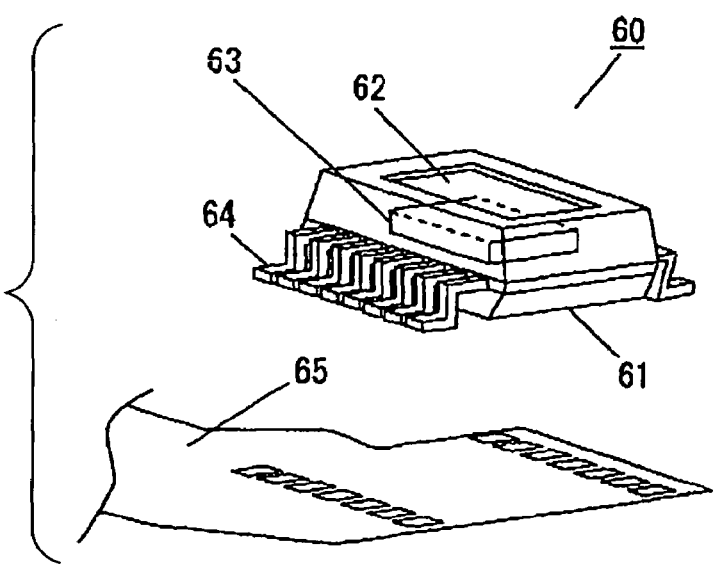
FIG. 8 is an overall perspective view of the light receiving device.

FIG. 8 is an overall perspective view the light receiving device 60. OE element 63 is accommodated in the package 61 having an incident port 62. A signal terminal of OE element 63 is connected to the lead terminal 64 and guided outside the package 61. Further, the lead terminal 64 is connected to the flexible cable 65 so that it can be used for inspection and mounting work. The reflection diffraction laser beam, which has conducted image formation on the light receiving section of OE element 63, is subjected to OE conversion at OE element 63 and changed into detection current I. By this detection current I, the tracking error (TE) signal and the focus error (FE) signal are calculated and guided outside the package 61 via the lead terminal 64. The thus guided signals are used for controlling an actuator of the optical disk device via the control unit such as CPU. In this connection, operation may be conducted as follows. In the light receiving device 60, operation is conducted until OE conversion of the reflection diffraction laser beam which has completed image formation in the light receiving device 60, and the tracking error (TE) signal and the focus error (FE) signal are calculated in a control unit not shown in the drawing in the same manner.

As shown in FIG. 5, in the case where the optical axis of the laser beam emergent from the laser beam source 52 is tilted, an intensity of the laser beam is decreased at all time when the laser beam becomes convergent light by the action of the objective lens 7, and an intensity of the laser beam irradiated on the optical disk 8 is insufficient for recording and reproducing information. In the case where a laser beam reflected on the optical disk 8 is detected by OE element 63 provided in the light receiving device 60 and it is detected that the intensity of the laser beam is low, a position of the laser beam source 52 is adjusted and fixed in the most appropriate state by moving the laser beam source adjustment member 55 and the laser beam source shift member 56 so that the optical axis of the laser beam emergent from the laser beam source 52 can be adjusted and set in the most appropriate state.

Explanations are made above into a case in which the laser beam source used for the laser module for DVD is adjusted. However, it should be noted that the above adjusting mechanism can be also used for CD.

Next, the hologram 6 for DVD and the hologram 40 for CD will be explained in more detail.

As shown in FIG. 1, the hologram 6 for DVD is arranged right below the objective lens 7. The inward laser beam for DVD, which has passed through this hologram 6 for DVD, forms an image on OE element 63 in the light receiving device 60 shown in FIG. 7. The hologram 40 for CD is arranged in a predetermined region on the first inclination face 36 of the fourth laser beam guide member 35. The inward laser beam for CD, which has passed through this hologram 40 for CD, forms an image on OE element 63 in the light receiving device 60 shown in FIG. 7.

Figure 9:
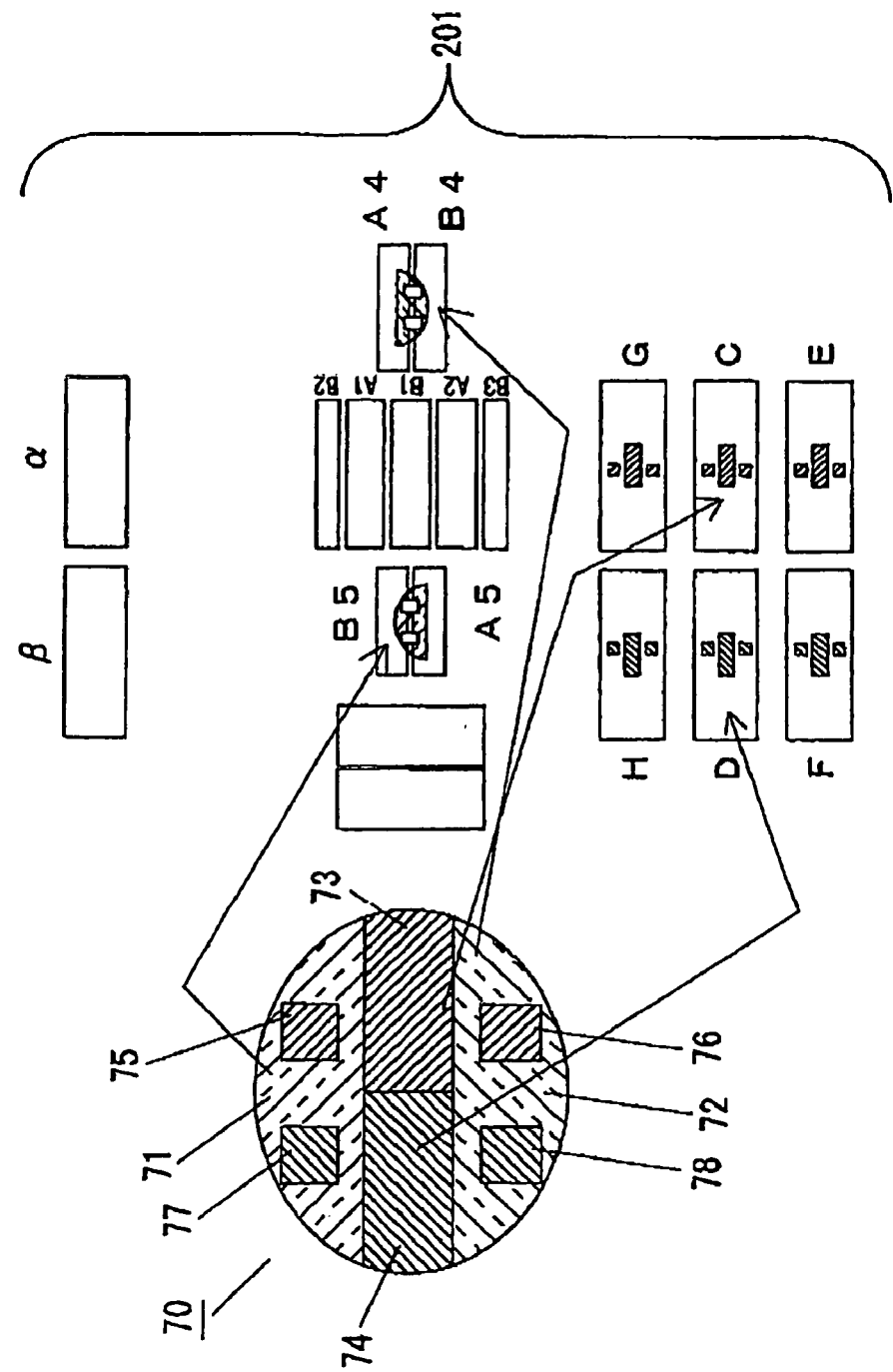
FIG. 9 is a view showing a division pattern of the hologram for CD and a pattern of OE element provided in the light receiving device.

FIG. 9 is a view showing a division pattern of the hologram 40 for CD (shown in FIG. 6) and a pattern of OE element 63 arranged in the light receiving device 60. FIG. 9 also shows a pattern of OE element 63 when the view is taken from the incident port 62.

In FIG. 9, reference numeral 70 is a diffraction grating which functions as the hologram 40 for CD (shown in FIG. 6). The diffraction grating 70 is divided into the gratings A71, B72, C73 and D74.

The detail of the diffraction grating is described as follows. The diffraction grating 70 is divided into three portions by two dividing lines parallel to the radial direction (X-axis) of the optical disk. One of the regions divided into a bow shape and separated in the tangential (tangent of the track: Y-axis) direction is the grating A71, and the other one is the grating B72. The regions in which the reflection diffraction laser beam of the grating A71 forms an image are the light receiving portion 201A5 and the light receiving portion 201B5 which are arranged at the center of the light receiving portion 201. The regions in which the reflection diffraction laser beam of the grating B72 forms an image are the light receiving portion 201A4 and the light receiving portion 201B4 which are arranged at a lower portion of the center of the light receiving portion 201. That is, the reflection diffraction laser beam is a primary beam for focus detection.

The central division region, which is the remaining division region, is further divided into two portions by the dividing lines parallel to the tangential (tangent of the track: Y-axis) direction of the optical disk, and these portions are respectively the grating C73 and the grating D74. That is, the regions of the grating C73 and the grating D74 are formed into a substantial D-shape.

Further, the separation grating A75 corresponding to the grating C73 is provided in the region of the grating A71. In the same manner, the separation grating B76 corresponding to the grating C73 is provided in the region of the grating B72. Further, the separation grating C77 corresponding to the grating D74 is provided in the region of the grating A71, and the separation grating D78 corresponding to the grating D74 is provided in the region of the grating B72.

The separation gratings A75 to D78 are composed so that the grating C73, the separation grating A75 and the separation grating B76 can be diffracted in the same direction, that is, the grating C73, the separation grating A75 and the separation grating B76 can be diffracted at the same position of OE element, and so that the grating D74, the separation grating C77 and the separation grating D78 can be diffracted in the same direction, that is, the grating D74, the separation grating C77 and the separation grating D78 can be diffracted at the position of the same OE element. The areas and the conditions of the diffracting optical power of the separation gratings A75 to D78 are all the same.

Since the grating C73, the separation grating A75 and the separation grating B76 can be diffracted in the same direction, the diffracted laser beam diffracted by the primary beam grating C73 is incident on the light receiving section 201C, and the diffracted laser beams diffracted by the primary beam separation grating A75 and the separation grating B76 are incident on the light receiving section 201C. In the same manner, the diffracted laser beams of the auxiliary beams of ± the first order laser beams are respectively incident on the light receiving sections 201E and 201G.

Since the grating D74, the separation grating C77 and the separation grating D78 are diffracted in the same direction, the diffracted laser beam diffracted by the primary beam grating D74 is incident on the light receiving section 201D, and the diffracted laser beams diffracted by the primary beam separation grating C77 and the separation grating D78 are also incident on the light receiving section 201D. In the same manner, the diffracted laser beams of the auxiliary beams of ± the first order laser beams are respectively incident on the light receiving sections 201F and 201H. These six types of optical beams are detected as three beams used for tracking control.

The reflected diffraction laser beam, by which an image has been formed in the light receiving section 201, is subjected to OE conversion and expressed by the detection current 1. The detection currents sent from the light receiving sections 201A5, 201B5, 201A4 and 201B4 are respectively expressed by IA5, IB5, IA4 and IB4. Then, in order to detect the focus, the detection current can be logically composed as follows. As the logic of detecting the focus error which will be referred to as FE hereinafter, the following expression can be obtained.

$$FE=(IA4+IA5)-(IB4+IB5) \quad \text{(Expression 1)}$$

The light receiving sections 201A4 and 201A5 can be electrically connected to each other on OE element 63. As a result, the sum of both the light receiving sections can be newly expressed by IA. When the light receiving sections 201B4 and 201B5 are electrically connected to each other in the same manner, the sum of both the light receiving sections can be newly expressed by IB. When the thus obtained IA and IB are substituted into Expression 1, the following expression can be obtained.

$$FE=IA-IB \quad \text{(Expression 2)}$$

When FE detection logic is composed by Expression 2, the following actions can be provided. Originally, the gratings A71 and B72 are bow-shaped regions which are opposed to each other in the tangential direction of the diffraction grating 70. Therefore, when the integrated optical member 20 is thermally expanded being affected by the heat generated by the laser element 13, since the gratings A71 and B72 are arranged distant from the center of the hologram 40 for CD, the largest positional change tends to occur by the thermal expansion. However, the light receiving sections 201A4, 201B4, 201A5 and 201B5, which receive the diffracted laser beam of the gratings A71 and B72, are respectively arranged in the reverse order and take the sum, and a difference of the reverse order sum is made to be FE detection logic. Therefore, a drift and offset of the detection signal caused by the above positional change can be canceled by Expression 2.

In the same manner as the above FE detection logic, the detection current by the six types of grating regions can be logically composed. As the tracking error (referred to as TE hereinafter) detection logic, the following expression can be obtained.

$$TE=IC-ID-k\{(IE+IG)-(IF+IH)\} \quad \text{(Expression 3)}$$

When TE detection logic is composed of Expression 3, the following actions can be provided. First, since the light receiving sections 201C, 201D detect the primary beam, the first and the second term of Expression 3 are normal TE detection.

Next, the third term expressed by the large parentheses in Expression 3 means that a differential operation is conducted when the sum of the respective auxiliary beam detection currents, which are obtained from the gratings C73 and D74 of the diffraction grating 70, is obtained. Accordingly, in the same manner as the above FE detection logic, a drift and offset of the detection signal caused by the above positional change can be canceled by Expression 3.

Especially, since the gratings A71 and B72 are divided into bow-shaped regions, the incident shape of the diffraction laser beam can be effectively distributed to the light receiving sections 201A5, 210B5 and the light receiving sections 201A4, 210B4 which are the light receiving sections divided into two portions. In the same manner, since the gratings C73, D74 are divided into D-shaped regions, the incident shape of the diffraction laser beam can be effectively distributed to the sensor areas of the light receiving section 201C, which is an independent light receiving section, to the light receiving section 201H.

Further, concerning the areas of the grating A71 to the grating D74, the entire region of the diffraction grating 70 is equally divided into four portions. Therefore, the diffraction grating 70 can be easily formed.

When the region of the diffraction grating is divided as described above, the following expression can be established.

$$(IA5+IB5)+(IA4+IB4)=(IC+ID) \quad \text{(Expression 4)}$$

Therefore, optical power can be supplied to the detection of RF signal, FE signal and TE signal being well balanced.

In this connection, constant k is expressed by the following expression.

$$k=(IC+ID)/(IE+IF+IG+IH) \quad \text{(Expression 5)}$$

Usually, the degree of amplification is adjusted at the time of OE conversion in the respective light receiving sections so that k=1.0. Three beams formed by the first diffraction grating 22 are formed into a ratio at which an intensity of optical power of the primary beam of zero-order light is 10 and an intensity of optical power of the auxiliary beam of ± the first order light is 1. When the degree of amplification of the light receiving section 201E, 201F, 201G and 201H is set at a value approximately five times higher than the degree of amplification of the light receiving section 201A and 201B, the condition of k=1.0 can be satisfied after the ratio of the intensity of optical power of each light receiving section is substituted into the above Expression 5.

In Expression 5, optical power of the auxiliary beam of ± the first order light is incident on the peripheral region of the diffraction grating 70. Therefore, in addition to the optical power of the gratings C73 and D74, optical power of the separation grating A75 to the separation grating D78 is added. Therefore, the denominator is increased. As a result, the degrees of amplification of the light receiving sections 201E, 201F, 201G and 201H can be set at a value much lower than the five times. Accordingly, it is possible to realize a detecting action of detecting a signal which is seldom affected by cross talk.

Figure 10:
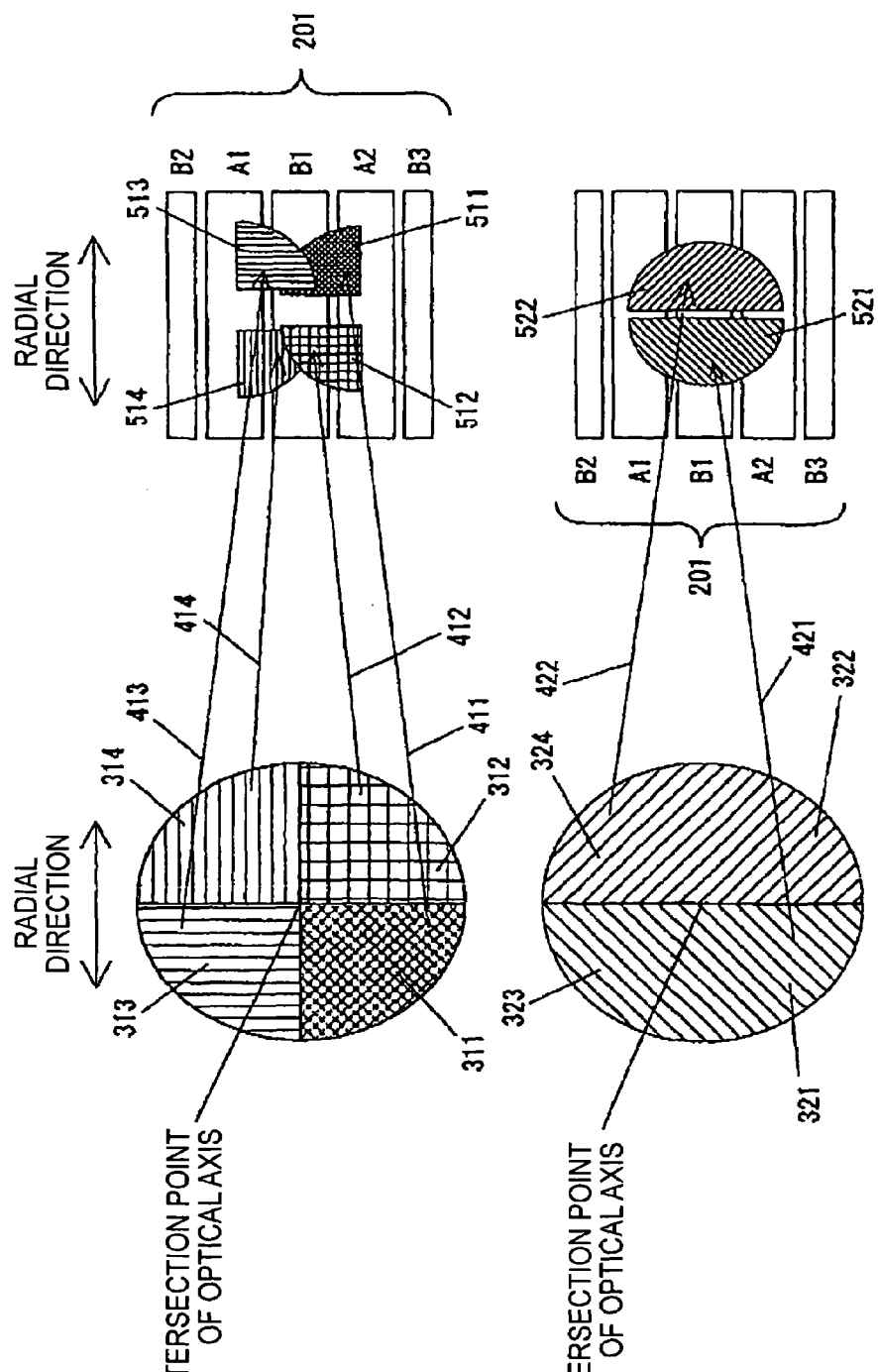
FIG. 10 is a view showing a division pattern for focus detection in the division pattern of the hologram for DVD.

FIG. 10 is a view showing a division pattern for detecting the focus which is in the division patterns of the hologram 6 for DVD.

The hologram 6 for DVD is divided into two portions by parallel division lines in the radial direction of the optical disk and further divided into two portions by parallel division lines in the tangential direction. Therefore, the hologram 6 for DVD is divided into four portions in total. The diffracted laser beam diffracted by each division region forms an image in a predetermined region of the light receiving section 201. The diffracted laser beams 411 and 412, which are diffracted by the division regions 311 and 312 shown in FIG. 10(a), respectively form an image in the regions 511 and 512 of the light receiving sections 201A2 and 201B1. The diffracted laser beams 413 and 414, which are diffracted by the division regions 313 and 314, respectively form an image in the regions 513 and 514 of the light receiving sections 201A1 and 201B1.

The diffraction laser beam 421 diffracted by the division regions 321, 323 shown in FIG. 10(b) forms an image in the region 521, and the diffraction laser beam 422 diffracted by the division regions 322, 324 forms an image in the region 522.

This image formation is conducted in either the light receiving section 201A1, 201A2, 201B1, 201B2 or 201B3 located at the center of the light receiving section 201. When the detection signals of the light receiving sections are expressed by IA1, IA2, IB1, IB2 and IB3, the focus error signal (FE) is calculated by the following relational expression.

$$FE=(IA1+IA2)-(IB1+IB2+IB3) \quad \text{(Expression 6)}$$

Figure 11:
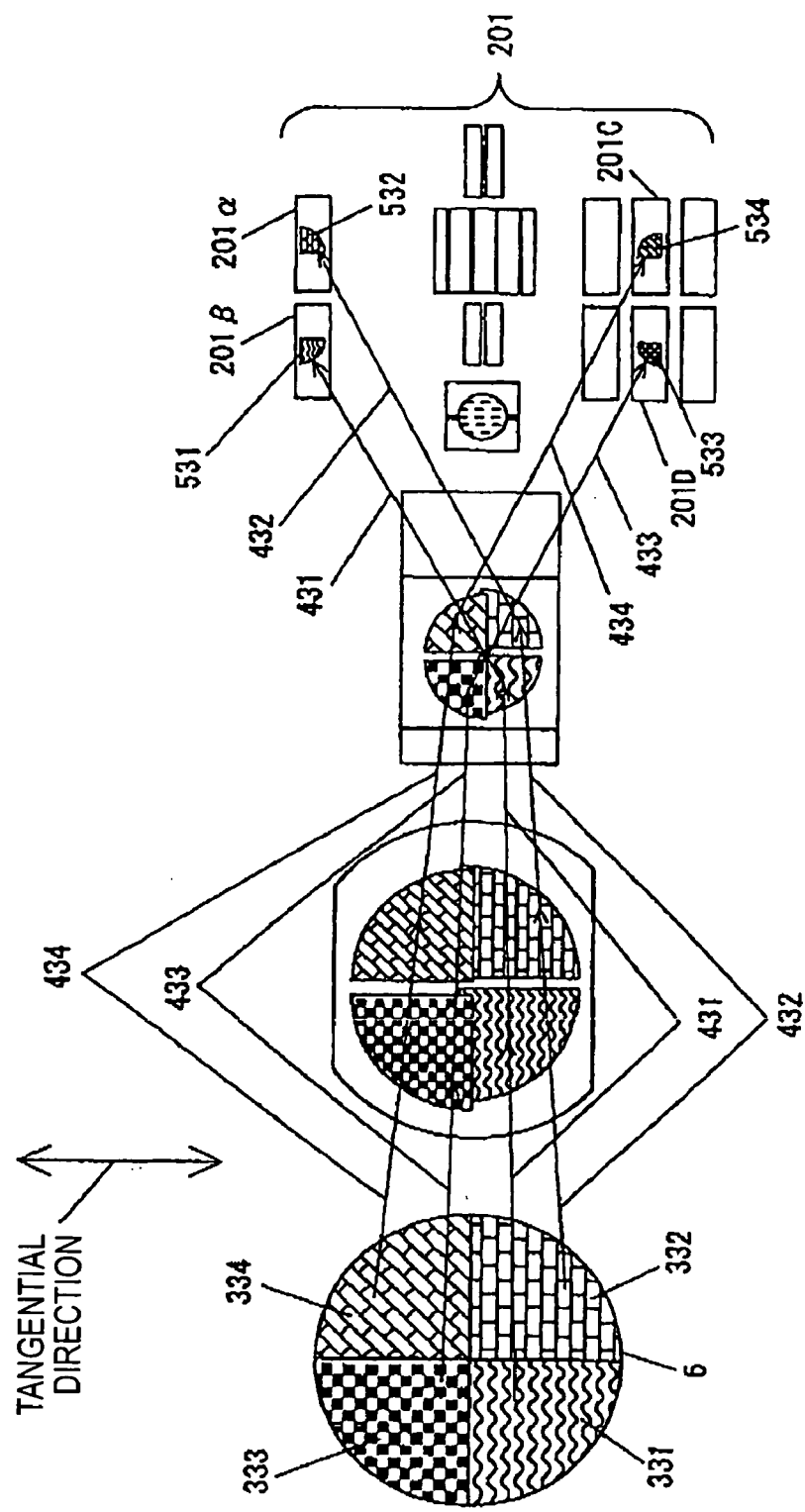
FIG. 11 is a view showing a division pattern for tracking detection in the division pattern of the hologram for DVD.

FIG. 11 is a view showing a division pattern for tracking detection in the division patterns of the hologram 6 for DVD.

The hologram 6 for DVD is divided into two portions by parallel division lines in the radial direction of the optical disk and further divided into two portions by parallel division lines in the tangential direction. Therefore, the hologram 6 for DVD is divided into four portions in total. The diffracted laser beam diffracted by each division region forms an image in a predetermined region of the light receiving section 201. The diffracted laser beam 431, which is diffracted by the division region 331 shown in FIG. 11, forms an image in the region 531 of the light receiving section 201β. The diffracted laser beam 432, which is diffracted by the division region 332, forms an image in the region 532 of the light receiving sections 201α. The diffraction laser beam 433 diffracted by the division region 333 forms an image in the region 533 of the light receiving section 201D, and the diffraction laser beam 434 diffracted by the division region 334 forms an image in the region 534 of the light receiving section 201C.

Figure 12:
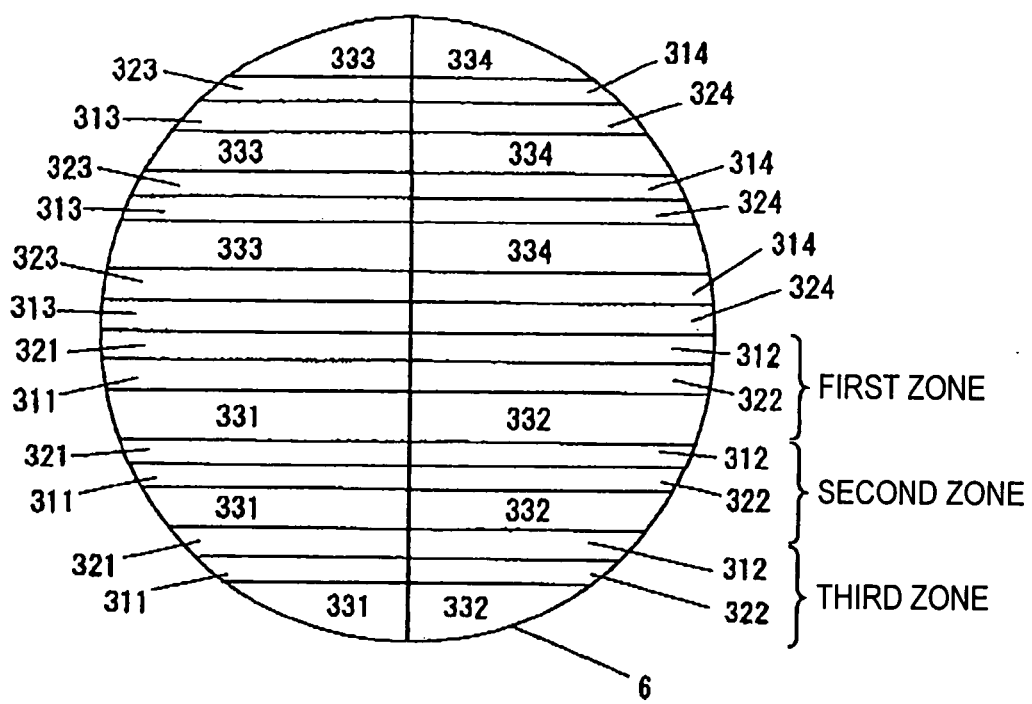
FIG. 12 is a view showing an example of the division pattern of the hologram for DVD.

FIG. 12 is a view showing an example in which the division pattern for focus detection and the division pattern for tracking detection are formed into one hologram 6 for DVD.

In FIG. 12, three zones of the first zone to the third zone are provided in each region which is obtained when the hologram 6 for DVD is divided into four portions by a division line parallel to the radial direction of the optical disk and by a division line parallel to the tangential direction of the optical disk. In each zone, the division pattern for tracking detection and the division pattern for focus detection are formed.

In this embodiment, after the above division pattern has been formed, a division pattern is formed corresponding to a change in the far-field pattern (referred to as FFP hereinafter) of the laser beam emergent from the laser beam source of the laser module 1 for DVD.

Figure 13:
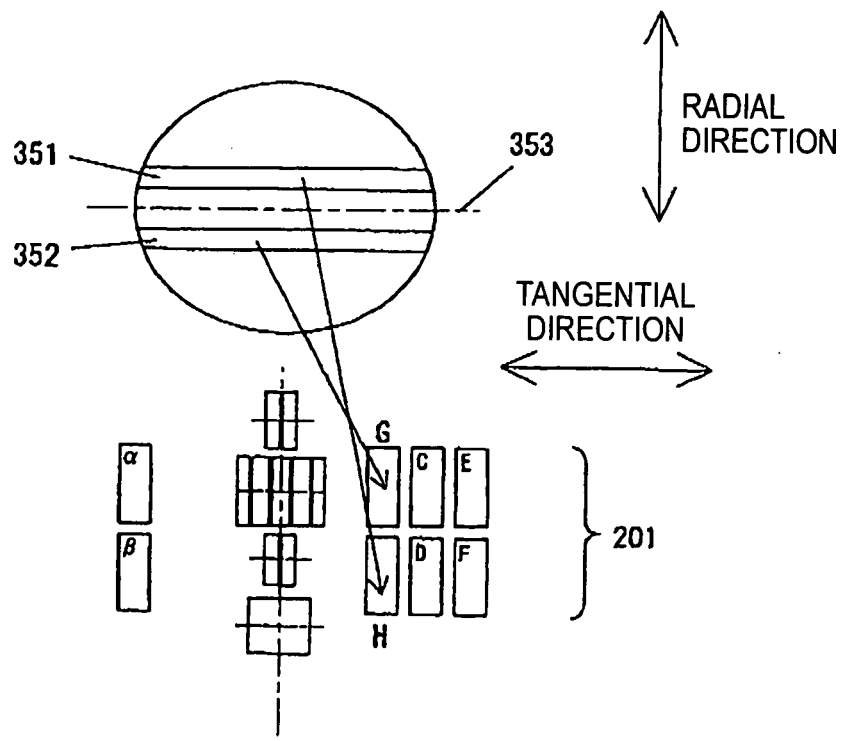
FIG. 13 is a view showing a division pattern of the hologram for DVD capable of detecting a tracking error even when deviation is caused in FFP of the emergent laser beam.
Figure 13:
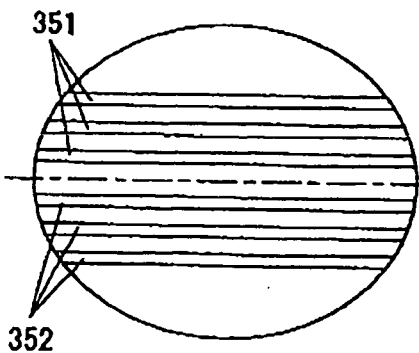
Figure 13:
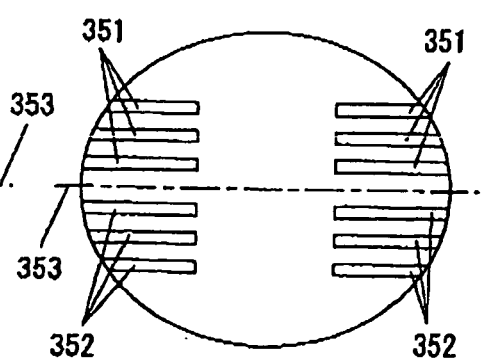

The following has been confirmed. When the temperature of the laser beam source is raised by the emission of a laser beam, FFP of the emergent laser beam deviates from the initial one. FIG. 13 is a view showing a division pattern of the hologram for DVD capable of detecting a tracking error even when FFP deviates from the original one as described above.

As shown in FIG. 13(a), the division regions 351 and 352, which are regions divided by a line parallel to the tangential direction of DVD, are formed symmetrical to each other with respect to the center line 353 in the radial direction of DVD. The diffraction laser beam diffracted by the division region 351 forms an image in the light receiving section 201H, and the diffraction laser beam diffracted by the division region 352 forms an image in the light receiving section 201G.

When the detection signals of the light receiving sections 201C, 201E, 201G, 201D, 201F, 201H, 201α and 201β are respectively IC, IE, IG, ID, IF, IH, Iα and Iβ, the tracking error signal (TE) is obtained by the following relational expression.

$$TE=(IC+I\alpha)-(ID+I\beta)-k\{(IE+IG)-(IF+IH)\} \quad \text{(Expression 7)}$$

In this case, k is a constant determined according to the operation setting.

Due to the foregoing, it is possible to detect a tracking error corresponding to the deviation of FFP.

FIGS. 13(b) and 13(c) are views showing an example in which more division regions 351 and 352 are formed symmetrically to each other with respect to the center line in the radial direction of DVD.

In FIG. 13(b), the same division regions as the division regions 351 and 352 shown in FIG. 13(a) are formed, wherein the number of the division regions to be formed is increased. In FIG. 13(c), only the peripheral region in the division region shown in FIG. 13(b) is made to be the division regions 351, 352. In either case, when a large number of division regions 351, 352 are formed, even when flaw exists on the optical disk, a bad influence given by the flaw to the laser beam reflected on the optical disk can be dispersed. Further, tracking error detection can be accurately conducted corresponding to the deviation of FFP.

Figure 14:
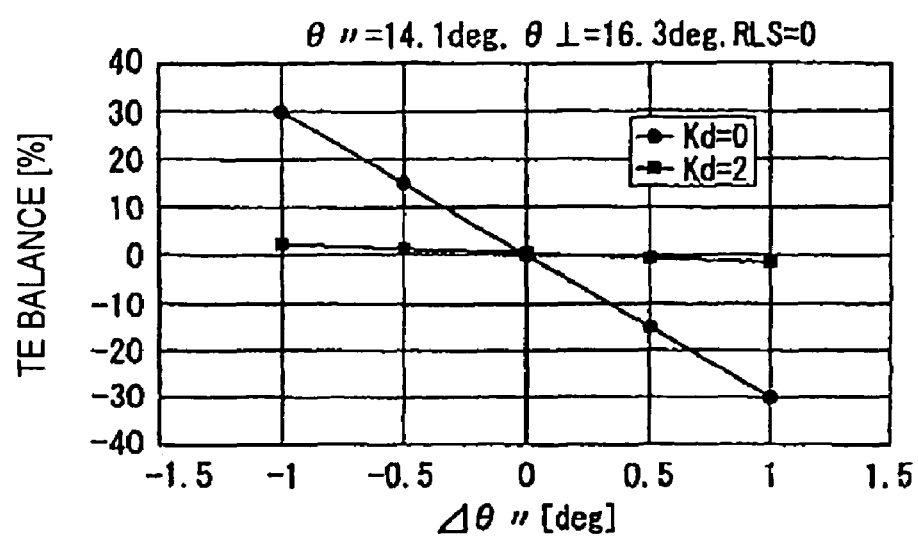
FIG. 14 is a view showing circumstances in which the tracking error detection is improved when deviation is caused in FFP of an emergent laser beam.

FIG. 14 is a view showing circumstances in which the tracking error balance is improved by the above means when deviation is caused in FFP. FIG. 14 is a view showing an example in which the tracking error balance caused by the deviation ($\Delta\theta_{11}$) of FFP is improved by the above means in the case where an extension of the optical beam on the face parallel to PN joining face of the laser element is 14.1 deg and an extension of the optical beam on the face perpendicular to PN joining face of the laser element is 16.3 deg.

Reference sign $K_d$ shown in FIG. 14 denotes a constant k determined by the operation setting in the above Expression 7 to find the tracking error signal (TE). The graph of $K_d=0$ shows the tracking error balance in the case where the constant k of Expression 7 is k=0, that is, in the case where the correction, in which the detection signals of the light receiving sections 201E, 201G, 201F and 201H are used, is not conducted. It can be understood that the tracking error balance of 30% is caused when FFP deviates by 1 deg. On the other hand, the graph of $K_d=2$ shows the tracking error balance in the case where the constant k of Expression 7 is k=2, and the correction is conducted. In this case, even when FFP deviates by 1 deg, the tracking error balance can be suppressed to be lower than 5%. Therefore, it is clear that the tracking error balance has been improved.

The present invention can be applied to an optical pickup device used for recording and reproducing information on an optical disk. The present invention can be applied to an optical disk device into which the optical pickup device is incorporated. According to the present invention, even in a small space, the laser beam source can be adjusted. While an intensity of the laser beam, which is necessary for recording and reproducing information, is being ensured, a highly reliable laser module, optical pickup device and optical disk device can be realized.

This application is based upon and claims the benefit of priority of Japanese Patent Application No2003-288775 filed on Mar. 8, 2007, Japanese Patent Application No2003-296059 filed on Mar. 8, 2007, and Japanese Patent Application No2004-219755 filed on Mar. 8, 2007, the content of which are incorporated herein by references in its entirety.

What is claimed is:

1. An optical pickup device comprising:
    a hologram for CD having a region for separating a luminous flux, which is used at least for tracking control, from a beam of reflected light which is emitted from a light source for CD and reflected on CD and which conducts at least one of the recording and reproducing of information by irradiating a laser beam on CD; and
    a hologram for DVD having a first region for separating a luminous flux, which is used at least for tracking control, from a beam of reflected light which is emitted from a light source for DVD and reflected on DVD and which conducts at least one of the recording and reproducing of information by irradiating a laser beam on DVD, the hologram for DVD also having a second region for separating a luminous flux which is used for correcting the tracking control, said second region being divided in parallel to the tangential direction of DVD, and said second region being divided into at least two portions arranged symmetrically to each other with respect to a center line in the radial direction of DVD.

2. An optical pickup device, comprising:
    a hologram for CD having a region for separating a luminous flux, which is used at least for tracking control, from a beam of reflected light which is emitted from a light source for CD and reflected on CD and which conducts at least one of the recording and reproducing of information by irradiating a laser beam on CD; and
    a hologram for DVD having a region for separating a luminous flux, which is used at least for tracking control, from a beam of reflected light which is emitted from a light source for DVD and reflected on DVD and which conducts at least one of the recording and reproducing of information by irradiating a laser beam on DVD, the hologram for DVD also having a region for separating a luminous flux which is used for correcting the tracking control,
    wherein the hologram for CD is divided into a central region and two bow-shaped regions in parallel with the radial direction of CD, and the central region is further divided into two substantially D-shaped regions in parallel with the tangential direction of CD.

3. The optical pickup device according to claim 2, wherein the two bow-shaped regions respectively have a separation grating for diffracting a reflected laser beam reflected on CD in the same direction as the direction of the substantially D-shaped region.

4. The optical pickup device according to claim 1, wherein the hologram for CD is provided on either of a plurality of faces formed on an integrated optical member for guiding a laser beam emergent from the laser beam source for CD and for separating a luminous flux to be used from a reflected laser beam reflected on CD.

5. An optical pickup device comprising:
    a hologram for CD having a region for separating a luminous flux, which is used at least for tracking control, from a beam of reflected light which is emitted from a light source for CD and reflected on CD and which conducts at least one of the recording and reproducing of information by irradiating a laser beam on CD; and
    a hologram for DVD having a region for separating a luminous flux, which is used at least for tracking control, from a beam of reflected light which is emitted from a light source for DVD and reflected on DVD and which conducts at least one of the recording and reproducing of information by irradiating a laser beam on DVD, the hologram for DVD also having a region for separating a luminous flux which is used for correcting the tracking control,
    wherein the hologram for DVD includes:
    a region for separating a luminous flux used for focus control, the region being divided in parallel to the radial direction of END and also divided in parallel to the tangential direction of DVD;
    a region for separating a luminous flux used for tracking control, the region being divided in parallel to the radial direction of DVD and also divided in parallel to the tangential direction of DVD; and
    a region for separating a luminous flux used for the correction of tracking control, the region being divided in parallel to the tangential direction of DVD, the region being divided into at least two portions arranged symmetrically to each other with respect to a center line in the radial direction of DVD.

6. The optical pickup device according to claim 2, wherein:
    the two bow-shaped regions are a first bow-shaped region and a second bow-shaped region, and
    the two substantially D-shaped regions are a first substantially D-shaped region and a second substantially D-shaped region, and
    the light receiving device for receiving a laser beam diffracted by the hologram for CD and converting the laser beam into an electric signal includes:
    two light receiving sections for receiving a diffracted laser beam sent from the first bow-shaped region;
    two light receiving sections for receiving a diffracted laser beam sent from the second bow-shaped region;
    three light receiving sections for receiving a diffracted laser beam sent from the first D-shaped region; and
    three light receiving sections for receiving a diffracted laser beam sent from the second D-shaped region.

7. The optical pickup device according to claim 5, wherein the light receiving device for receiving a laser beam diffracted by the hologram for DVD and converting the laser beam into an electric signal includes five light receiving sections for receiving a diffracted laser beam sent from the region to separate a luminous flux used for focus control.

8. The optical pickup device according to claim 5, wherein the light receiving device for receiving a laser beam diffracted by the hologram for DVD and converting the laser beam into an electric signal includes eight light receiving sections for receiving a diffracted laser beam sent from the region to separate a luminous flux used for tracking control and also receiving a diffracted laser beam sent from the region to separate a luminous flux used for the correction of tracking control.

9. The optical pickup device according to claim 6, wherein the focus error signal (FE) is calculated by the relational expression of $$FE=(IA4+IA5)-(IB4+IB5),$$

wherein detection signals of two light receiving sections for receiving a diffracted laser beam sent from the first bow-shaped region are respectively denoted by IA4 and IB4, and detection signals of two light receiving sections for receiving a diffracted laser beam sent from the second bow-shaped region are respectively denoted by IA5 and IB5.

10. The optical pickup device according to claim 6, wherein the tracking error signal (TE) is calculated by the relational expression of $$TE=IC-ID-k\{(IE+IG)-(IF+IH)\}$$

(Reference sign k is a constant determined by the operation setting.)
where detection signals of three light receiving sections for receiving a diffracted laser beam sent from the first substantially D-shaped region are respectively denoted by IC, IE and IG, and detection signals of three light receiving sections for receiving a diffracted laser beam sent from the second substantially D-shaped region are respectively denoted by ID, IF and IH.

11. The optical pickup device according to claim 7, wherein the focus error signal (FE) is calculated by the relational expression of $$FE=(IA1+IA2)-(IB1+IB2+IB3),$$

where detection signals of the five light receiving sections are respectively denoted by IA1, IA2, IB1, IB2 and IB3.

12. The optical pickup device according to claim 8, wherein the tracking error signal (TE) is calculated by the relational expression of $$TE=(IC+I\alpha)-(ID+I\beta)-k\{(IE+IG)-(IF+IH)\}$$

(Reference sign k is a constant determined by the operation setting.)
where detection signals of the eight light receiving sections are respectively denoted by IC, IE, IG, ID, IF, IH, Iα and Iβ.

13. An optical disk device comprising an optical pickup device according to claim 1.

14. An optical disk device comprising an optical pickup device according to claim 2.

15. An optical disk device comprising an optical pickup device according to claim 3.

16. An optical disk device comprising an optical pickup device according to claim 4.

17. An optical disk device comprising an optical pickup device according to claim 5.

18. An optical disk device comprising an optical pickup device according to claim 6.

19. An optical disk device comprising an optical pickup device according to claim 7.

20. An optical disk device comprising an optical pickup device according to claim 8.

21. An optical disk device comprising an optical pickup device according to claim 9.

22. An optical disk device comprising an optical pickup device according to claim 10.

23. An optical disk device comprising an optical pickup device according to claim 11.

24. An optical disk device comprising an optical pickup device according to claim 12.

25. A focus error detection method applied to an optical pickup device,
the optical pickup device comprising:
a hologram for CD having a region for separating a luminous flux, which is used at least for tracking control, from a beam of reflected light which is emitted from a light source for CD and reflected on CD and which conducts at least one of the recording and reproducing of information by irradiating a laser beam on CD; and
a hologram for DVD having a region for separating a luminous flux, which is used at least for tracking control, from a beam of reflected light which is emitted from a light source for DVD and reflected on DVD and which conducts at least one of the recording and reproducing of information by irradiating a laser beam on DVD, the hologram for DVD also having a region for separating a luminous flux which is used for correcting the tracking control, wherein
the hologram for CD is divided into a central region and two bow-shaped regions in parallel with the radial direction of CD, and the central region is further divided into two substantially D-shaped regions in parallel with the tangential direction of CD,
the two bow-shaped regions are a first bow-shaped region and a second bow-shaped region, and
the light receiving device for receiving a laser beam diffracted by the hologram for CD and converting the laser beam into an electric signal includes: two light receiving sections for receiving a diffracted laser beam sent from the first bow-shaped region and also includes two light receiving sections for receiving a diffracted laser beam sent from the second bow-shaped region, and
the focus error signal (FE) is calculated by the relational expression of $$FE=(IA4+IA5)-(IB4+IB5),$$

where detection signals of two light receiving sections for receiving a diffracted laser beam sent from the first bow-shaped region are respectively denoted by IA4 and IB4, and detection signals of two light receiving sections for receiving a diffracted laser beam sent from the second bow-shaped region are respectively denoted by IA5 and IB5.

26. A tracking error detection method applied to an optical pickup device,
the optical pickup device comprising:
a hologram for CD having a region for separating a luminous flux, which is used at least for tracking control, from a beam of reflected light which is emitted from a light source for CD and reflected on CD and which conducts at least one of the recording and reproducing of information by irradiating a laser beam on CD; and
a hologram for DVD having a region for separating a luminous flux, which is used at least for tracking control, from a beam of reflected light which is emitted from a light source for DVD and reflected on DVD and which conducts at least one of the recording and reproducing of information by irradiating a laser beam on DVD, the hologram for DVD also having a region for separating a luminous flux which is used for correcting the tracking control, wherein
the hologram for CD is divided into a central region and two bow-shaped regions in parallel with the radial direction of CD, and the central region is further divided into two substantially D-shaped regions in parallel with the tangential direction of CD, the two substantially D-shaped regions are a first substantially D-shaped region and a second substantially D-shaped region, the light receiving device for receiving a laser beam diffracted by the hologram for CD and converting the laser beam into an electric signal includes three light receiving sections for receiving a diffracted laser beam sent from the first D-shaped region and also includes three light receiving sections for receiving a diffracted laser beam sent from the second D-shaped region, the tracking error signal (TE) is calculated by the relational expression of $$TE=IC-ID-k\{(IE+IG)-(IF+IH)\}$$

(Reference sign k is a constant determined by the operation setting.)

where detection signals of three light receiving sections for receiving a diffracted laser beam sent from the first substantially D-shaped region are respectively denoted by IC, IE and IG, and detection signals of three light receiving sections for receiving a diffracted laser beam sent from the second substantially D-shaped region are respectively denoted by ID, IF and IH.

27. A focus error detection method applied to an optical pickup device, the optical pickup device comprising:

a hologram for CD having a region for separating a luminous flux, which is used at least for tracking control, from a beam of reflected light which is emitted from a light source for CD and reflected on CD and which conducts at least one of the recording and reproducing of information by irradiating a laser beam on CD; and a hologram for DVD having a region for separating a luminous flux, which is used at least for tracking control, from a beam of reflected light which is emitted from a light source for DVD and reflected by DVD and which conducts at least one of the recording and reproducing of information by irradiating a laser beam on DVD, the hologram for DVD also having a region for separating a luminous flux which is used for correcting the tracking control, wherein the hologram for DVD includes a region for separating a luminous flux used for focus control, the region being divided in parallel to the radial direction of DVD and also divided in parallel to the tangential direction of DVD, and the light receiving device for receiving a laser beam diffracted by the hologram for DVD and converting the laser beam into an electric signal has five light receiving sections for receiving a diffracted laser beam sent from the region for separating a luminous flux used for focus control, and the focus error signal (FE) is calculated by the relational expression of $$FE=(IA1+IA2)-(IB1+IB2+IB3),$$

where detection signals of the five light receiving sections are respectively denoted by IA1, IA2, IB1, IB2 and IB3.

28. A tracking error detection method applied to an optical pickup device, the optical pickup device comprising:

a hologram for CD having a region for separating a luminous flux, which is used at least for tracking control, from a beam of reflected light which is emitted from a light source for CD and reflected on CD and which conducts at least one of the recording and reproducing of information by irradiating a laser beam on CD; and a hologram for DVD having a region for separating a luminous flux, which is used at least for tracking control, from a beam of reflected light which is emitted from a light source for DVD and reflected by DVD and which conducts at least one of the recording and reproducing of information by irradiating a laser beam on DVD, the hologram for DVD also having a region for separating a luminous flux which is used for correcting the tracking control, wherein the hologram for DVD includes a region for separating a luminous flux used for tracking control, the region being divided in parallel to the radial direction of DVD and also divided in parallel to the tangential direction of DVD and also includes a region for separating a luminous flux used for the correction of tracking control, the region being divided in parallel to the tangential direction of DVD, the region being divided into at least two portions arranged symmetrically to each other with respect to a center line in the radial direction of DVD, the light receiving device for receiving a laser beam diffracted by the hologram for DVD and converting the laser beam into an electric signal has eight light receiving sections for receiving a diffracted laser beam sent from the region for separating a luminous flux used for tracking control and for receiving a diffracted laser beam sent from the region to separate a luminous flux used for correcting the tracking control, and the tracking error signal (TE) is calculated by the relational expression of $$TE=(IC+I\alpha)-(ID+I\beta)-k\{(IE+IG)-(IF+IH)\},$$

(Reference sign k is a constant determined according to the operation setting.)

where the detection signals of the eight light receiving sections are respectively denoted by IC, IE, IG, ID, IF, IH, Iα and Iβ.

* * * * *